United States Patent
Nagaraja et al.

(10) Patent No.: US 11,265,742 B2
(45) Date of Patent: Mar. 1, 2022

(54) RADIO LINK MONITORING WITH SUB-BANDS AND INTERFERENCE MEASUREMENTS

(71) Applicant: QUALCOMM Incorporated, San Diego, CA (US)

(72) Inventors: Sumeeth Nagaraja, San Diego, CA (US); Peter Gaal, San Diego, CA (US); Wanshi Chen, San Diego, CA (US); Tao Luo, San Diego, CA (US); Heechoon Lee, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 112 days.

(21) Appl. No.: 15/979,051

(22) Filed: May 14, 2018

(65) Prior Publication Data
US 2018/0338253 A1    Nov. 22, 2018

Related U.S. Application Data

(60) Provisional application No. 62/507,763, filed on May 17, 2017.

(51) Int. Cl.
*H04W 28/02* (2009.01)
*H04W 24/08* (2009.01)
(Continued)

(52) U.S. Cl.
CPC .......... *H04W 24/08* (2013.01); *H04B 17/345* (2015.01); *H04B 17/382* (2015.01);
(Continued)

(58) Field of Classification Search
CPC .............. H04L 25/0224; H04L 25/02; H04W 72/0453; H04W 24/08; H04W 24/10; H04W 88/06
See application file for complete search history.

(56) References Cited

U.S. PATENT DOCUMENTS 8,712,401 B2    4/2014 Yoo et al.
8,976,698 B2    3/2015 Chen et al.
(Continued)

FOREIGN PATENT DOCUMENTS

CN    104205697 A    12/2014
CN    106464444 A    2/2017
(Continued)

OTHER PUBLICATIONS

International Search Report and Written Opinion—PCT/US2018/032733—ISA/EPO—dated Jul. 26, 2018.
(Continued)

*Primary Examiner* — Anez C Ebrahim
(74) *Attorney, Agent, or Firm* — Patterson + Sheridan, L.L.P.

(57) ABSTRACT

Certain aspects of the present disclosure relate to methods and apparatus for radio link monitoring with BWPs and interference measurements using communications systems operating according to new radio (NR) technologies. Certain aspects provide a method for wireless communication. The method generally includes determining one or more bandwidth parts (BWPs) for radio link monitoring (RLM) based on one or more signals; and configuring a user equipment (UE) to monitor the one or more signals on the one or more BWPs within a maximum channel bandwidth.

43 Claims, 13 Drawing Sheets

(51) Int. Cl.
  *H04W 88/06*   (2009.01)
  *H04B 17/345*  (2015.01)
  *H04B 17/382*  (2015.01)
  *H04L 5/00*    (2006.01)
  *H04W 72/04*   (2009.01)
  *H04L 25/02*   (2006.01)
  *H04W 24/10*   (2009.01)

(52) U.S. Cl.
  CPC .............. *H04L 5/001* (2013.01); *H04W 88/06* (2013.01); *H04L 5/0051* (2013.01); *H04L 5/0094* (2013.01); *H04L 25/0224* (2013.01); *H04W 24/10* (2013.01); *H04W 72/0453* (2013.01)

(56) References Cited

U.S. PATENT DOCUMENTS

| | | | |
|---|---|---|---|
| 2011/0009117 A1* | 1/2011 | Breuer | H04W 36/0088 455/434 |
| 2011/0070911 A1 | 3/2011 | Zhang et al. | |
| 2011/0085448 A1* | 4/2011 | Kuwahara | H04W 16/10 370/242 |
| 2012/0182879 A1 | 7/2012 | Tamura et al. | |
| 2013/0252606 A1 | 9/2013 | Nimbalker et al. | |
| 2013/0301434 A1 | 11/2013 | Krishnamurthy et al. | |
| 2014/0347662 A1 | 11/2014 | Hodges et al. | |
| 2015/0172949 A1 | 6/2015 | Lee et al. | |
| 2015/0295626 A1* | 10/2015 | Zhao | H04B 7/0417 370/329 |
| 2016/0127093 A1 | 5/2016 | Jiang et al. | |
| 2017/0332267 A1* | 11/2017 | Kim | H04L 5/005 |

FOREIGN PATENT DOCUMENTS

| | | |
|---|---|---|
| KR | 20140144205 A | 12/2014 |
| WO | 2011130665 A1 | 10/2011 |
| WO | 2014025380 A1 | 2/2014 |
| WO | 2016056802 A1 | 4/2016 |

OTHER PUBLICATIONS

Qualcomm Incorporated: "Common Control Resource Set and UE-Specific Control Resource Set," 3GPP Draft, R1-1700816 Detail Control Resource Set, 3rd Generation Partnership Project—(3GPP), Mobile Competence Centre, 650, Route Des Lucioles, F-06921 Sophia-Antipolis Cedex, France vol. RAN WG2, No. Spokane, U.S.A. Jan. 16, 2017-Jan. 20, 2017, Jan. 10, 2017 (Jan. 10, 2017), XP051203129, pp. 1-3, Retrieved from the Internet: URL:http://www.3gpp.org/ftp/tsg_ran/WG1_RL1/TSGR1_AH/NR_AH_1701/Docs/ [retrieved on Jan. 10, 2017].

* cited by examiner

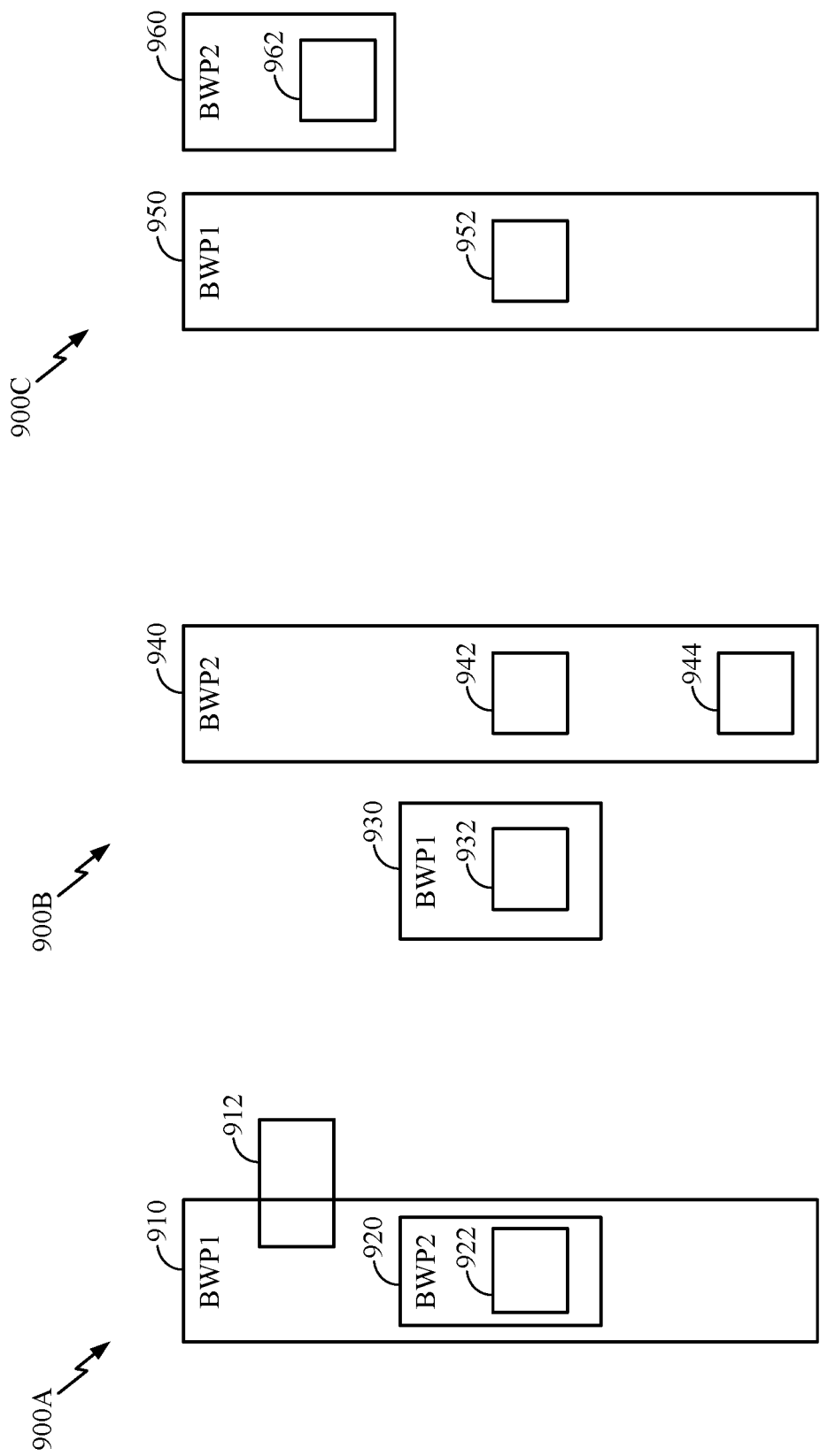

_US 11,265,742 B2_

RADIO LINK MONITORING WITH SUB-BANDS AND INTERFERENCE MEASUREMENTS

CLAIM OF PRIORITY UNDER 35 U.S.C. § 119

The present Application for patent claims benefit of U.S. Provisional Patent Application Ser. No. 62/507,763, filed May 17, 2017, assigned to the assignee hereof and hereby expressly incorporated by reference herein.

BACKGROUND

Field of the Disclosure

The present disclosure relates generally to communication systems, and more particularly, to methods and apparatus for radio link monitoring using communications systems operating according to new radio (NR) technologies.

Description of Related Art

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include Long Term Evolution (LTE) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

In some examples, a wireless multiple-access communication system may include a number of base stations, each simultaneously supporting communication for multiple communication devices, otherwise known as user equipment (UEs). In LTE or LTE-A network, a set of one or more base stations may define an eNodeB (eNB). In other examples (e.g., in a next generation or 5G network), a wireless multiple access communication system may include a number of distributed units (DUs) (e.g., edge units (EUs), edge nodes (ENs), radio heads (RHs), smart radio heads (SRHs), transmission reception points (TRPs), etc.) in communication with a number of central units (CUs) (e.g., central nodes (CNs), access node controllers (ANCs), etc.), where a set of one or more distributed units, in communication with a central unit, may define an access node (e.g., a new radio base station (NR BS), a new radio node-B (NR NB), a network node, 5G NB, eNB, Next Generation Node B (gNB), etc.). A base station or DU may communicate with a set of UEs on downlink channels (e.g., for transmissions from a base station or to a UE) and uplink channels (e.g., for transmissions from a UE to a base station or distributed unit).

These multiple access technologies have been adopted in various telecommunication standards to provide a common protocol that enables different wireless devices to communicate on a municipal, national, regional, and even global level. An example of an emerging telecommunication standard is new radio (NR), for example, 5G radio access. NR is a set of enhancements to the LTE mobile standard promulgated by Third Generation Partnership Project (3GPP). It is designed to better support mobile broadband Internet access by improving spectral efficiency, lowering costs, improving services, making use of new spectrum, and better integrating with other open standards using OFDMA with a cyclic prefix (CP) on the downlink (DL) and on the uplink (UL) as well as support beamforming, multiple-input multiple-output (MIMO) antenna technology, and carrier aggregation.

However, as the demand for mobile broadband access continues to increase, there exists a desire for further improvements in NR technology. Preferably, these improvements should be applicable to other multi-access technologies and the telecommunication standards that employ these technologies.

BRIEF SUMMARY

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "Detailed Description" one will understand how the features of this disclosure provide advantages that include improved communications between access points and stations in a wireless network.

Certain aspects provide a method for wireless communication by a network entity. The method generally includes determining one or more BWPs for radio link monitoring (RLM) based on one or more signals, and configuring a user equipment (UE) to monitor the one or more signals on the one or more BWPs within a maximum channel bandwidth.

Certain aspects provide a method for wireless communication by a user equipment (UE). The method generally includes receiving a reference signal (RS) configuration from a radio access network (RAN), determining one or more BWPs to monitor within a maximum channel bandwidth, based on the RS configuration, and monitoring one or more signals on the one or more BWPs within the maximum channel bandwidth based on the RS configuration.

Certain aspects provide an apparatus for wireless communication by a network entity. The apparatus generally includes means for determining one or more bandwidth parts (BWPs) for radio link monitoring (RLM) based on one or more signals, and means for configuring a user equipment (UE) to monitor the one or more signals on the one or more BWPs within a maximum channel bandwidth.

Certain aspects provide an apparatus for wireless communication by a user equipment (UE). The apparatus generally includes means for receiving a reference signal (RS) configuration from a radio access network (RAN), means for determining one or more bandwidth parts (BWPs) to monitor within a maximum channel bandwidth, based on the RS configuration, and means for monitoring one or more signals on the one or more BWPs within the maximum channel bandwidth based on the RS configuration.

Certain aspects provide an apparatus for wireless communication by a network entity. The apparatus generally includes at least one processor configured to determining one or more bandwidth parts (BWPs) for radio link monitoring (RLM) based on one or more signals, and configuring a user equipment (UE) to monitor the one or more signals on the one or more BWPs within a maximum channel bandwidth, and a memory coupled to the at least one processor.

Certain aspects provide an apparatus for wireless communication by a user equipment (UE). The apparatus generally includes at least one processor configured to receiving a reference signal (RS) configuration from a radio access network (RAN), determining one or more bandwidth parts (BWPs) to monitor within a maximum channel bandwidth, based on the RS configuration, and monitoring one or more signals on the one or more BWPs within the maximum channel bandwidth based on the RS configuration, and a memory coupled to the at least one processor.

Certain aspects provide a non-transitory computer readable medium for wireless communication by a network entity having instructions stored thereon. The instructions generally include determining one or more bandwidth parts (BWPs) for radio link monitoring (RLM) based on one or more signals, and configuring a user equipment (UE) to monitor the one or more signals on the one or more BWPs within a maximum channel bandwidth.

Certain aspects provide a non-transitory computer readable medium for wireless communication by a user equipment (UE) having instructions stored thereon. The instructions generally include receiving a reference signal (RS) configuration from a radio access network (RAN), determining one or more bandwidth parts (BWPs) to monitor within a maximum channel bandwidth, based on the RS configuration, and monitoring one or more signals on the one or more BWPs within the maximum channel bandwidth based on the RS configuration.

Aspects generally include methods, apparatus, systems, computer readable mediums, and processing systems, as substantially described herein with reference to and as illustrated by the accompanying drawings.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects.

FIGS. 9A, 9B, and 9C illustrate examples of bandwidth parts (BWPs)/sub-bands in accordance with aspects of the present disclosure.

To facilitate understanding, identical reference numerals have been used, where possible, to designate identical elements that are common to the figures. It is contemplated that elements described in one aspect may be beneficially utilized on other aspects without specific recitation.

DETAILED DESCRIPTION

Figure 1:
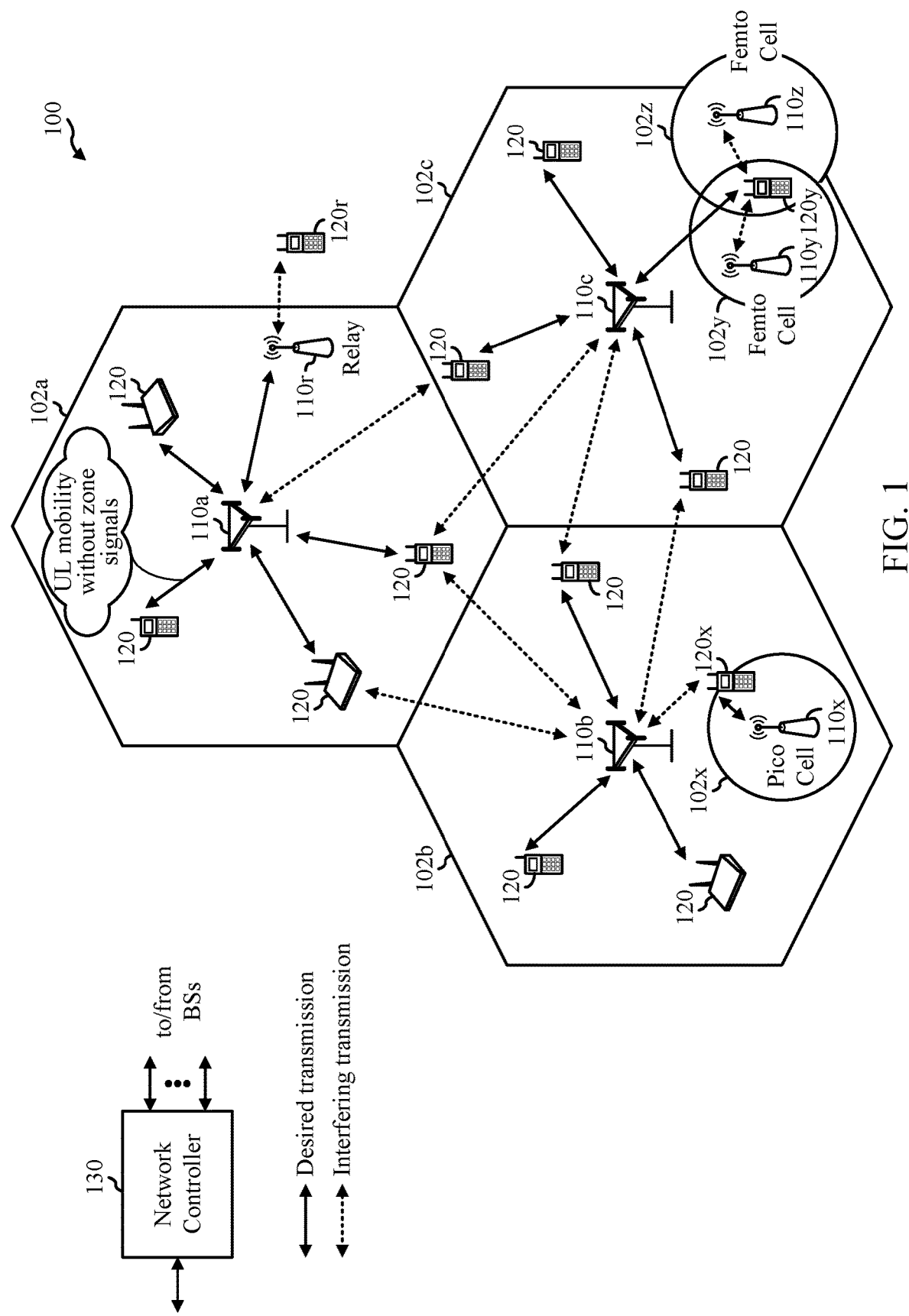
FIG. 1 is a block diagram conceptually illustrating an example telecommunications system, in which aspects of the present disclosure may be performed.

Aspects of the present disclosure provide apparatus, methods, processing systems, and computer readable mediums for new radio (NR) (new radio access technology or 5G technology).

NR may support various wireless communication services, such as Enhanced mobile broadband (eMBB) targeting wide bandwidth (e.g. 80 MHz beyond), millimeter wave (mmW) targeting high carrier frequency (e.g. 27 GHz or beyond), massive MTC (mMTC) targeting non-backward compatible MTC techniques, and/or mission critical targeting ultra-reliable low latency communications (URLLC). These services may include latency and reliability requirements. These services may also have different transmission time intervals (TTI) to meet respective quality of service (QoS) requirements. In addition, these services may co-exist in the same subframe.

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure described herein may be embodied by one or more elements of a claim. The word "exemplary" is used herein to mean "serving as an example, instance, or illustration." Any aspect described herein as "exemplary" is not necessarily to be construed as preferred or advantageous over other aspects.

The techniques described herein may be used for various wireless communication networks such as LTE, CDMA, TDMA, FDMA, OFDMA, SC-FDMA and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). NR is an emerging wireless communications technology under development in conjunction with the 5G Technology Forum (5GTF). 3GPP Long Term Evolution (LTE) and LTE-Advanced (LTE-A) are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). "LTE" refers generally to LTE, LTE-Advanced (LTE-A), LTE in an unlicensed spectrum (LTE-whitespace), etc. The techniques described herein may be used for the wireless networks and radio technologies mentioned above as well as other wireless networks and radio technologies. For clarity, while aspects may be described herein using terminology commonly associated with 3G and/or 4G wireless technologies, aspects of the present disclosure can be applied in other generation-based communication systems, such as 5G and later, including NR technologies.

Example Wireless Communications System

FIG. 1 illustrates an example wireless network 100, such as a new radio (NR) or 5G network, in which aspects of the present disclosure may be performed.

As illustrated in FIG. 1, the wireless network 100 may include a number of BSs 110 and other network entities. A BS may be a station that communicates with UEs. Each BS 110 may provide communication coverage for a particular geographic area. In 3GPP, the term "cell" can refer to a coverage area of a Node B and/or a Node B subsystem serving this coverage area, depending on the context in which the term is used. In NR systems, the term "cell" and eNB, Node B, 5G NB, AP, NR BS, NR BS, gNB, or TRP may be interchangeable. In some examples, a cell may not necessarily be stationary, and the geographic area of the cell may move according to the location of a mobile base station. In some examples, the base stations may be interconnected to one another and/or to one or more other base stations or network nodes (not shown) in the wireless network 100 through various types of backhaul interfaces such as a direct physical connection, a virtual network, or the like using any suitable transport network.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a frequency channel, etc. Each frequency may support a single RAT in a given geographic area in order to avoid interference between wireless networks of different RATs. In some cases, NR or 5G RAT networks may be deployed.

A BS may provide communication coverage for a macro cell, a pico cell, a femto cell, and/or other types of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a Closed Subscriber Group (CSG), UEs for users in the home, etc.). A BS for a macro cell may be referred to as a macro BS. A BS for a pico cell may be referred to as a pico BS. A BS for a femto cell may be referred to as a femto BS or a home BS. In the example shown in FIG. 1, the BSs 110a, 110b and 110c may be macro BSs for the macro cells 102a, 102b and 102c, respectively. The BS 110x may be a pico BS for a pico cell 102x. The BSs 110y and 110z may be femto BS for the femto cells 102y and 102z, respectively. A BS may support one or multiple (e.g., three) cells.

The wireless network 100 may also include relay stations. A relay station is a station that receives a transmission of data and/or other information from an upstream station (e.g., a BS or a UE) and sends a transmission of the data and/or other information to a downstream station (e.g., a UE or a BS). A relay station may also be a UE that relays transmissions for other UEs. In the example shown in FIG. 1, a relay station 110r may communicate with the BS 110a and a UE 120r in order to facilitate communication between the BS 110a and the UE 120r. A relay station may also be referred to as a relay BS, a relay, etc.

The wireless network 100 may be a heterogeneous network that includes BSs of different types, e.g., macro BS, pico BS, femto BS, relays, etc. These different types of BSs may have different transmit power levels, different coverage areas, and different impact on interference in the wireless network 100. For example, macro BS may have a high transmit power level (e.g., 20 Watts) whereas pico BS, femto BS, and relays may have a lower transmit power level (e.g., 1 Watt).

The wireless network 100 may support synchronous or asynchronous operation. For synchronous operation, the BSs may have similar frame timing, and transmissions from different BSs may be approximately aligned in time. For asynchronous operation, the BSs may have different frame timing, and transmissions from different BSs may not be aligned in time. The techniques described herein may be used for both synchronous and asynchronous operation.

A network controller 130 may be coupled to a set of BSs and provide coordination and control for these BSs. The network controller 130 may communicate with the BSs 110 via a backhaul. The BSs 110 may also communicate with one another, e.g., directly or indirectly via wireless or wireline backhaul.

The UEs 120 (e.g., 120x, 120y, etc.) may be dispersed throughout the wireless network 100, and each UE may be stationary or mobile. A UE may also be referred to as a mobile station, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or medical equipment, a healthcare device, a biometric sensor/device, a wearable device such as a smart watch, smart clothing, smart glasses, virtual reality goggles, a smart wrist band, smart jewelry (e.g., a smart ring, a smart bracelet, etc.), an entertainment device (e.g., a music device, a video device, a satellite radio, etc.), a vehicular component or sensor, a smart meter/sensor, a robot, a drone, industrial manufacturing equipment, a positioning device (e.g., GPS, Beidou, terrestrial), or any other suitable device that is configured to communicate via a wireless or wired medium. Some UEs may be considered machine-type communication (MTC) devices or evolved MTC (eMTC) devices, which may include remote devices that may communicate with a base station, another remote device, or some other entity. Machine type communications (MTC) may refer to communication involving at least one remote device on at least one end of the communication and may include forms of data communication which involve one or more entities that do not necessarily need human interaction. MTC UEs may include UEs that are capable of MTC communications with MTC servers and/or other MTC devices through Public Land Mobile Networks (PLMN), for example. MTC and eMTC UEs include, for example, robots, drones, remote devices, sensors, meters, monitors, cameras, location tags, etc., that may communicate with a BS, another device (e.g., remote device), or some other entity. A wireless node may provide, for example, connectivity for or to a network (e.g., a wide area network such as Internet or a cellular network) via a wired or wireless communication link. MTC UEs, as well as other UEs, may be implemented as Internet-of-Things (IoT) devices, e.g., narrowband IoT (NB-IoT) devices.

In FIG. 1, a solid line with double arrows indicates desired transmissions between a UE and a serving BS, which is a BS designated to serve the UE on the downlink and/or uplink. A dashed line with double arrows indicates interfering transmissions between a UE and a BS.

Certain wireless networks (e.g., LTE) utilize orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (called a 'resource block') may be 12 subcarriers (or 180 kHz). Consequently, the nominal FFT size may be equal to 128, 256, 512, 1024 or 2048 for system bandwidth of 1.25, 2.5, 5, 10 or 20 megahertz (MHz), respectively. The system bandwidth may also be partitioned into subbands. For example, a subband may cover 1.08 MHz (e.g., 6 resource blocks), and there may be 1, 2, 4, 8 or 16 subbands for system bandwidth of 1.25, 2.5, 5, 10 or 20 MHz, respectively.

While aspects of the examples described herein may be associated with LTE technologies, aspects of the present disclosure may be applicable with other wireless communications systems, such as NR. NR may utilize OFDM with a CP on the uplink and downlink and include support for half-duplex operation using time division duplex (TDD). A single component carrier bandwidth of 100 MHz may be supported. NR resource blocks may span 12 sub-carriers with a sub-carrier bandwidth of 75 kHz over a 0.1 ms duration. Each radio frame may consist of 2 half frames, each half frame consisting of 5 subframes, with a length of 10 ms. Consequently, each subframe may have a length of 1 ms. Each subframe may indicate a link direction (e.g., DL or UL) for data transmission and the link direction for each subframe may be dynamically switched. Each subframe may include DL/UL data as well as DL/UL control data. UL and DL subframes for NR may be as described in more detail below with respect to FIGS. 6 and 7. Beamforming may be supported and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells. Alternatively, NR may support a different air interface, other than an OFDM-based. NR networks may include entities such CUs and/or DUs.

In some examples, access to the air interface may be scheduled, wherein a scheduling entity (e.g., a base station) allocates resources for communication among some or all devices and equipment within its service area or cell. Within the present disclosure, as discussed further below, the scheduling entity may be responsible for scheduling, assigning, reconfiguring, and releasing resources for one or more subordinate entities. That is, for scheduled communication, subordinate entities utilize resources allocated by the scheduling entity. Base stations are not the only entities that may function as a scheduling entity. That is, in some examples, a UE may function as a scheduling entity, scheduling resources for one or more subordinate entities (e.g., one or more other UEs). In this example, the UE is functioning as a scheduling entity, and other UEs utilize resources scheduled by the UE for wireless communication. A UE may function as a scheduling entity in a peer-to-peer (P2P) network, and/or in a mesh network. In a mesh network example, UEs may optionally communicate directly with one another in addition to communicating with the scheduling entity.

Thus, in a wireless communication network with a scheduled access to time-frequency resources and having a cellular configuration, a P2P configuration, and a mesh configuration, a scheduling entity and one or more subordinate entities may communicate utilizing the scheduled resources.

As noted above, a RAN may include a CU and DUs. A NR BS (e.g., eNB, 5G Node B, Node B, transmission reception point (TRP), access point (AP)) may correspond to one or multiple BSs. NR cells can be configured as access cell (ACells) or data only cells (DCells). For example, the RAN (e.g., a central unit or distributed unit) can configure the cells. DCells may be cells used for carrier aggregation or dual connectivity, but not used for initial access, cell selection/reselection, or handover. In some cases DCells may not transmit synchronization signals—in some case cases DCells may transmit SS. NR BSs may transmit downlink signals to UEs indicating the cell type. Based on the cell type indication, the UE may communicate with the NR BS. For example, the UE may determine NR BSs to consider for cell selection, access, handover, and/or measurement based on the indicated cell type.

Figure 2:
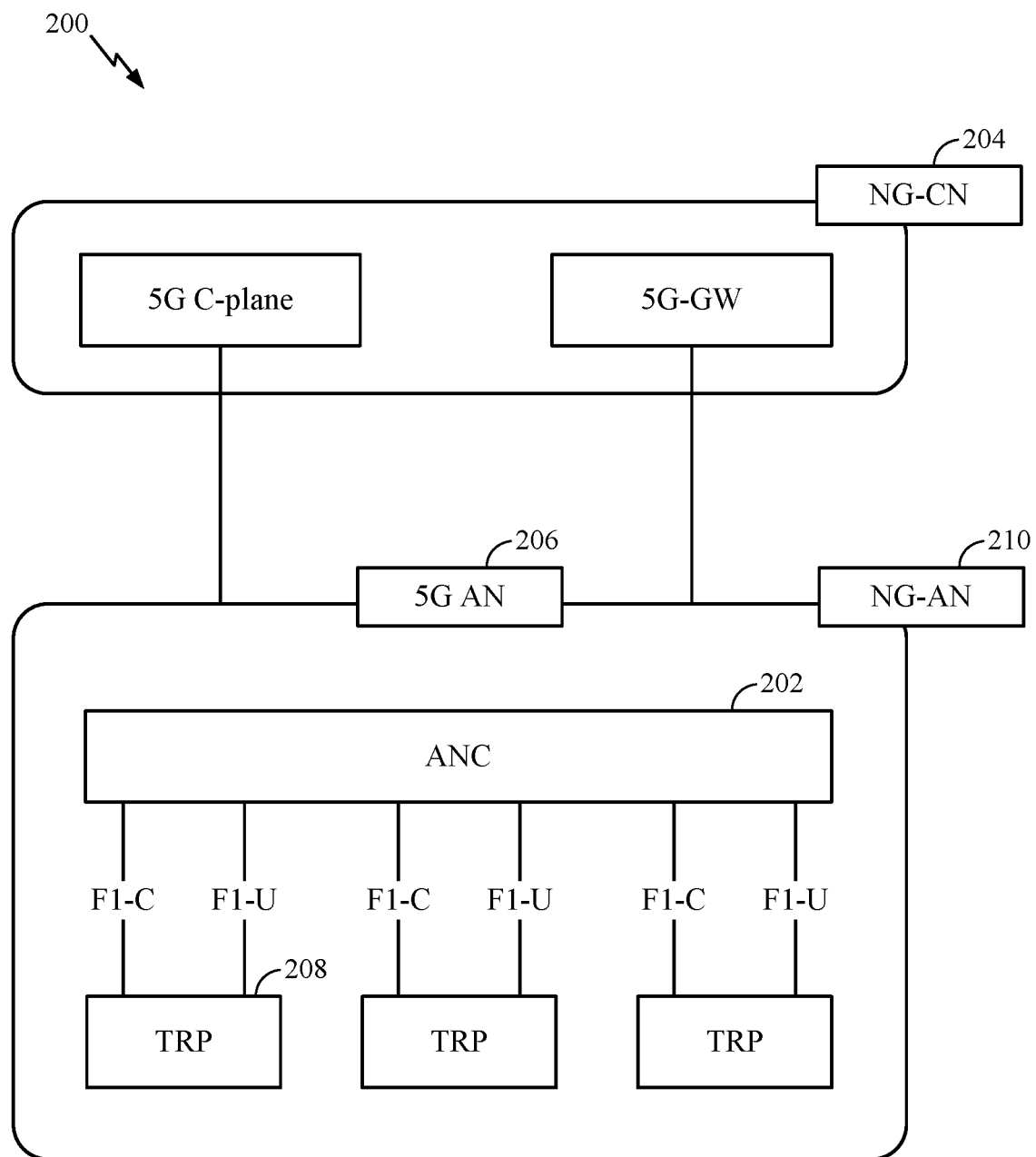
FIG. 2 is a block diagram illustrating an example logical architecture of a distributed RAN, in accordance with certain aspects of the present disclosure.

FIG. 2 illustrates an example logical architecture of a distributed radio access network (RAN) 200, which may be implemented in the wireless communication system illustrated in FIG. 1. A 5G access node 206 may include an access node controller (ANC) 202. The ANC may be a central unit (CU) of the distributed RAN 200. The backhaul interface to the next generation core network (NG-CN) 204 may terminate at the ANC. The backhaul interface to neighboring next generation access nodes (NG-ANs) may terminate at the ANC. The ANC may include one or more TRPs 208 (which may also be referred to as BSs, NR BSs, Node Bs, 5G NBs, APs, gNBs, or some other term). As described above, a TRP may be used interchangeably with "cell."

The TRPs 208 may be a DU. The TRPs may be connected to one ANC (ANC 202) or more than one ANC (not illustrated). For example, for RAN sharing, radio as a service (RaaS), and service specific AND deployments, the TRP may be connected to more than one ANC. A TRP may include one or more antenna ports. The TRPs may be configured to individually (e.g., dynamic selection) or jointly (e.g., joint transmission) serve traffic to a UE.

The local architecture 200 may be used to illustrate fronthaul definition. The architecture may be defined that support fronthauling solutions across different deployment types. For example, the architecture may be based on transmit network capabilities (e.g., bandwidth, latency, and/or jitter).

The architecture may share features and/or components with LTE. According to aspects, the next generation AN (NG-AN) 210 may support dual connectivity with NR. The NG-AN may share a common fronthaul for LTE and NR.

The architecture may enable cooperation between and among TRPs 208. For example, cooperation may be preset within a TRP and/or across TRPs via the ANC 202. According to aspects, no inter-TRP interface may be needed/present.

According to aspects, a dynamic configuration of split logical functions may be present within the architecture 200. As will be described in more detail with reference to FIG. 5, the Radio Resource Control (RRC) layer, Packet Data Convergence Protocol (PDCP) layer, Radio Link Control (RLC) layer, Medium Access Control (MAC) layer, and a Physical (PHY) layers may be adaptably placed at the DU or CU (e.g., TRP or ANC, respectively). According to certain aspects, a BS may include a central unit (CU) (e.g., ANC 202) and/or one or more distributed units (e.g., one or more TRPs 208).

Figure 3:
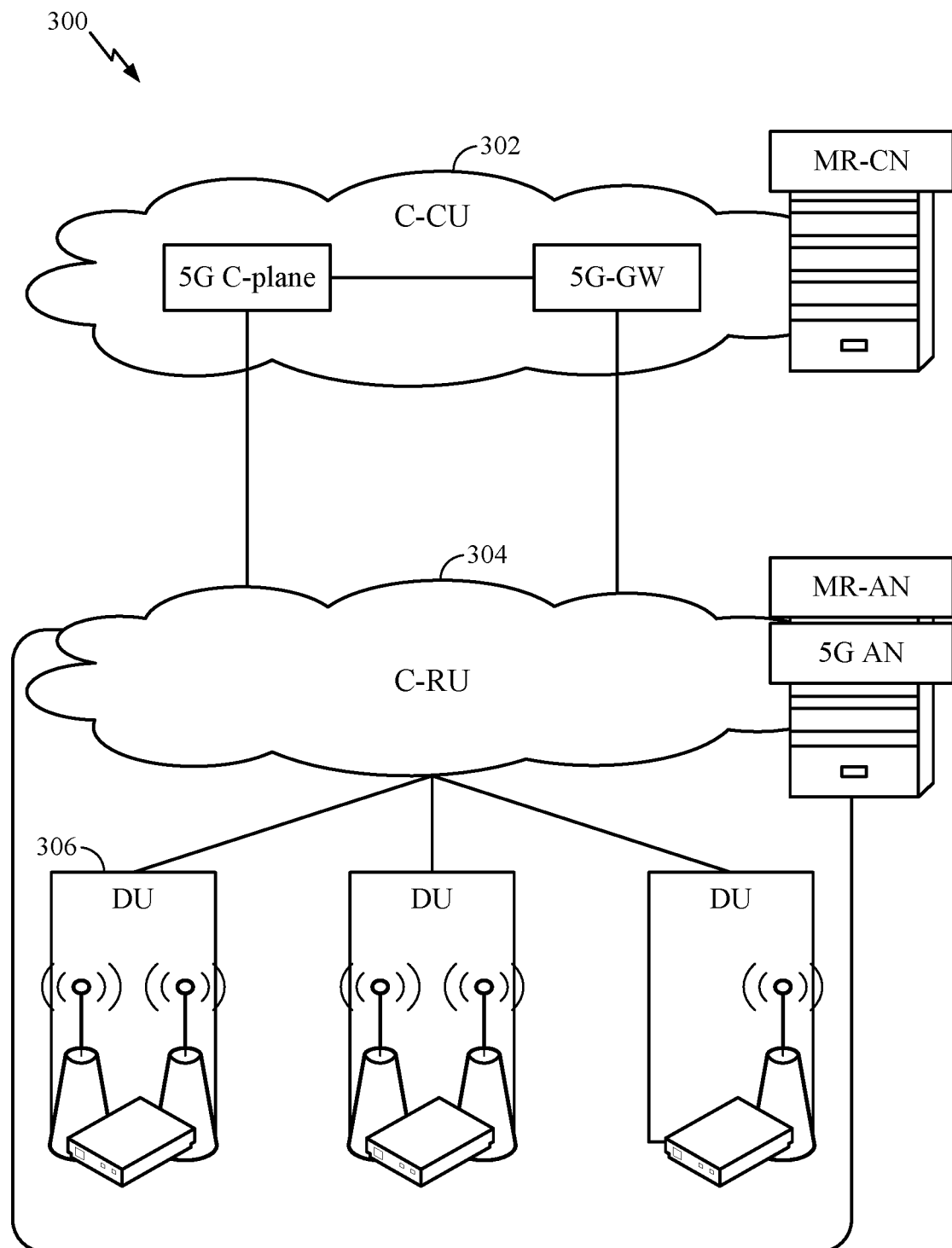
FIG. 3 is a diagram illustrating an example physical architecture of a distributed RAN, in accordance with certain aspects of the present disclosure.

FIG. 3 illustrates an example physical architecture of a distributed RAN 300, according to aspects of the present disclosure. A centralized core network unit (C-CU) 302 may host core network functions. The C-CU may be centrally deployed. C-CU functionality may be offloaded (e.g., to advanced wireless services (AWS)), in an effort to handle peak capacity.

A centralized RAN unit (C-RU) 304 may host one or more ANC functions. Optionally, the C-RU may host core network functions locally. The C-RU may have distributed deployment. The C-RU may be closer to the network edge.

A DU 306 may host one or more TRPs (edge node (EN), an edge unit (EU), a radio head (RH), a smart radio head (SRH), or the like). The DU may be located at edges of the network with radio frequency (RF) functionality.

Figure 4:
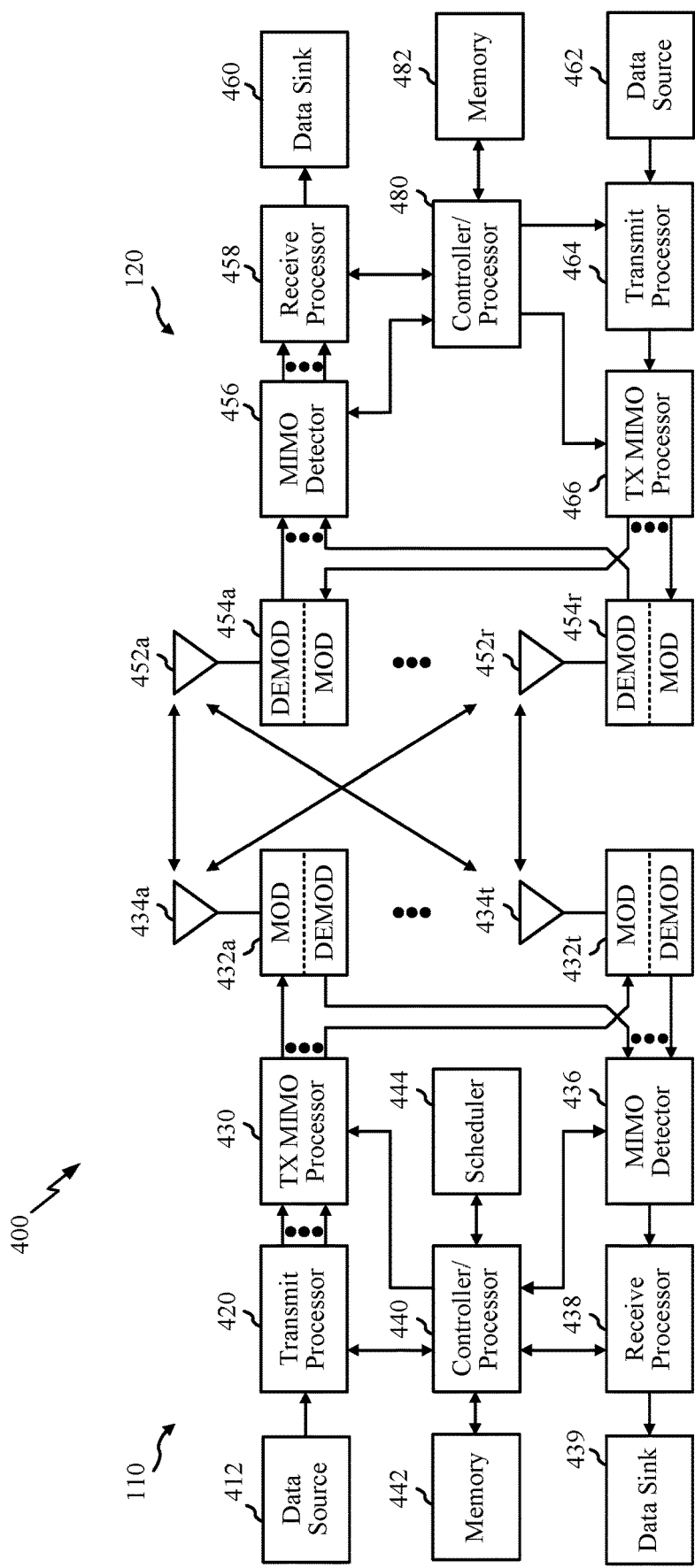
FIG. 4 is a block diagram conceptually illustrating a design of an example BS and user equipment (UE), in accordance with certain aspects of the present disclosure.

FIG. 4 illustrates example components of the BS 110 and UE 120 illustrated in FIG. 1, which may be used to implement aspects of the present disclosure. As described above, the BS may include a TRP. One or more components of the BS 110 and UE 120 may be used to practice aspects of the present disclosure. For example, antennas 452, MOD/DEMOD 454, processors 466, 458, 464, and/or controller/processor 480 of the UE 120 and/or antennas 434, MOD/DEMOD 432, processors 430, 420, 438, and/or controller/processor 440 of the BS 110 may be used to perform the operations described herein and illustrated with reference to FIGS. 7 and 8.

FIG. 4 shows a block diagram of a design of a BS 110 and a UE 120, which may be one of the BSs and one of the UEs in FIG. 1. For a restricted association scenario, the base station 110 may be the macro BS 110c in FIG. 1, and the UE 120 may be the UE 120y. The base station 110 may also be a base station of some other type. The base station 110 may be equipped with antennas 434a through 434t, and the UE 120 may be equipped with antennas 452a through 452r.

At the base station 110, a transmit processor 420 may receive data from a data source 412 and control information from a controller/processor 440. The control information may be for the Physical Broadcast Channel (PBCH), Physical Control Format Indicator Channel (PCFICH), Physical Hybrid ARQ Indicator Channel (PHICH), Physical Downlink Control Channel (PDCCH), etc. The data may be for the Physical Downlink Shared Channel (PDSCH), etc. The processor 420 may process (e.g., encode and symbol map) the data and control information to obtain data symbols and control symbols, respectively. The processor 420 may also generate reference symbols, e.g., for the PSS, SSS, and cell-specific reference signal. A transmit (Tx) multiple-input multiple-output (MIMO) processor 430 may perform spatial processing (e.g., precoding) on the data symbols, the control symbols, and/or the reference symbols, if applicable, and may provide output symbol streams to the modulators (MODs) 432a through 432t. For example, the Tx MIMO processor 430 may perform certain aspects described herein for RS multiplexing. Each modulator 432 may process a respective output symbol stream (e.g., for OFDM, etc.) to obtain an output sample stream. Each modulator 432 may further process (e.g., convert to analog, amplify, filter, and upconvert) the output sample stream to obtain a downlink signal. Downlink signals from modulators 432a through 432t may be transmitted via the antennas 434a through 434t, respectively.

At the UE 120, the antennas 452a through 452r may receive the downlink signals from the base station 110 and may provide received signals to the demodulators (DEMODs) 454a through 454r, respectively. Each demodulator 454 may condition (e.g., filter, amplify, downconvert, and digitize) a respective received signal to obtain input samples. Each demodulator 454 may further process the input samples (e.g., for OFDM, etc.) to obtain received symbols. A MIMO detector 456 may obtain received symbols from all the demodulators 454a through 454r, perform MIMO detection on the received symbols if applicable, and provide detected symbols. For example, MIMO detector 456 may provide detected RS transmitted using techniques described herein. A receive processor 458 may process (e.g., demodulate, deinterleave, and decode) the detected symbols, provide decoded data for the UE 120 to a data sink 460, and provide decoded control information to a controller/processor 480. According to one or more cases, CoMP aspects can include providing the antennas, as well as some Tx/Rx functionalities, such that they reside in distributed units. For example, some Tx/Rx processings can be done in the central unit, while other processing can be done at the distributed units. For example, in accordance with one or more aspects as shown in the diagram, the BS mod/demod 432 may be in the distributed units.

On the uplink, at the UE 120, a transmit processor 464 may receive and process data (e.g., for the Physical Uplink Shared Channel (PUSCH)) from a data source 462 and control information (e.g., for the Physical Uplink Control Channel (PUCCH) from the controller/processor 480. The transmit processor 464 may also generate reference symbols for a reference signal. The symbols from the transmit processor 464 may be precoded by a TX MIMO processor 466 if applicable, further processed by the demodulators 454a through 454r (e.g., for SC-FDM, etc.), and transmitted to the base station 110. At the BS 110, the uplink signals from the UE 120 may be received by the antennas 434, processed by the modulators 432, detected by a MIMO detector 436 if applicable, and further processed by a receive processor 438 to obtain decoded data and control information sent by the UE 120. The receive processor 438 may provide the decoded data to a data sink 439 and the decoded control information to the controller/processor 440.

The controllers/processors 440 and 480 may direct the operation at the base station 110 and the UE 120, respectively. The processor 440 and/or other processors and modules at the base station 110 may perform or direct the processes for the techniques described herein. The processor 480 and/or other processors and modules at the UE 120 may also perform or direct processes for the techniques described herein. The memories 442 and 482 may store data and program codes for the BS 110 and the UE 120, respectively. A scheduler 444 may schedule UEs for data transmission on the downlink and/or uplink.

Figure 5:
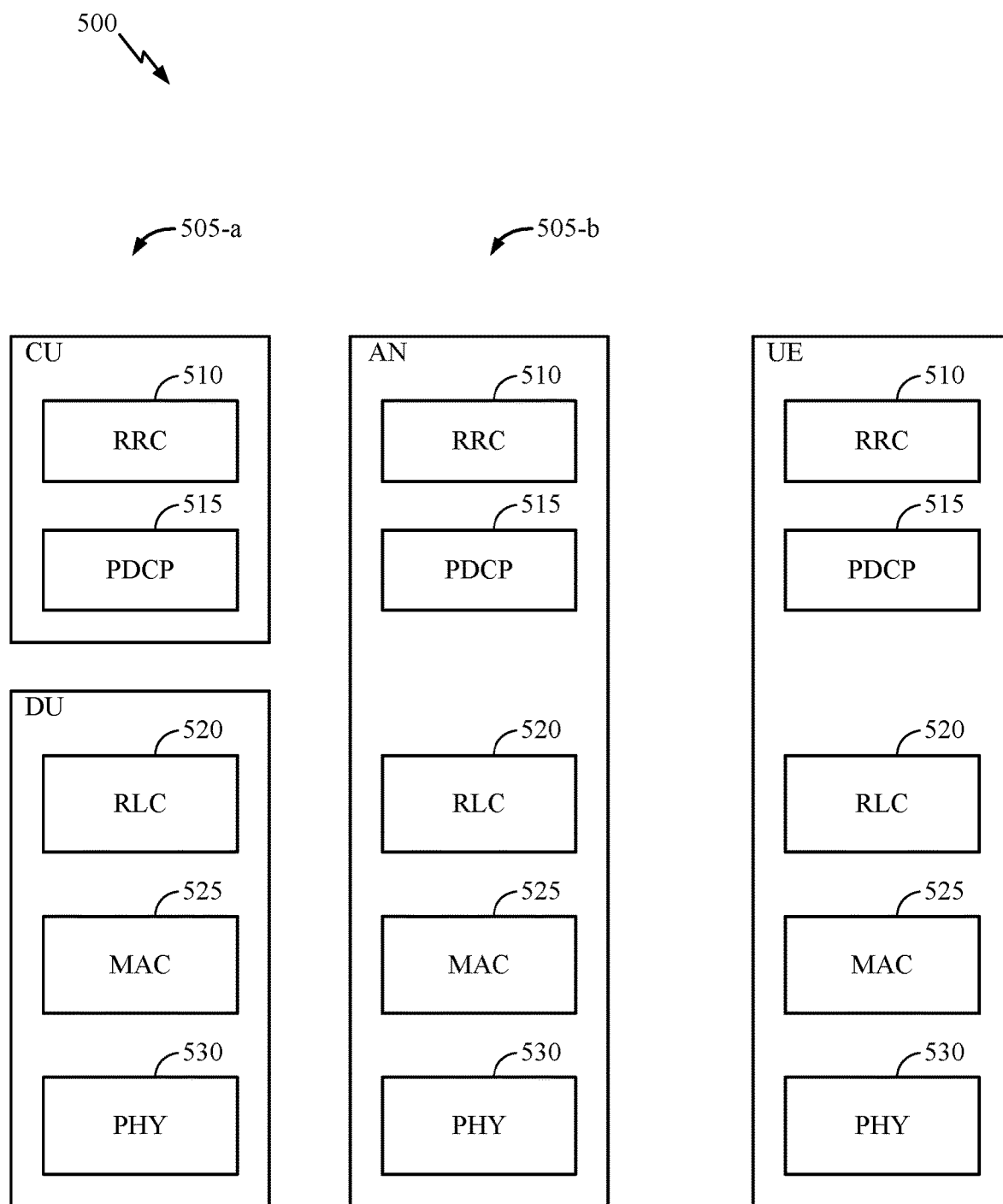
FIG. 5 is a diagram showing examples for implementing a communication protocol stack, in accordance with certain aspects of the present disclosure.

FIG. 5 illustrates a diagram 500 showing examples for implementing a communications protocol stack, according to aspects of the present disclosure. The illustrated communications protocol stacks may be implemented by devices operating in a in a 5G system (e.g., a system that supports uplink-based mobility). Diagram 500 illustrates a communications protocol stack including a Radio Resource Control (RRC) layer 510, a Packet Data Convergence Protocol (PDCP) layer 515, a Radio Link Control (RLC) layer 520, a Medium Access Control (MAC) layer 525, and a Physical (PHY) layer 530. In various examples the layers of a protocol stack may be implemented as separate modules of software, portions of a processor or ASIC, portions of non-collocated devices connected by a communications link, or various combinations thereof. Collocated and non-collocated implementations may be used, for example, in a protocol stack for a network access device (e.g., ANs, CUs, and/or DUs) or a UE.

A first option 505-a shows a split implementation of a protocol stack, in which implementation of the protocol stack is split between a centralized network access device (e.g., an ANC 202 in FIG. 2) and distributed network access device (e.g., DU 208 in FIG. 2). In the first option 505-a, an RRC layer 510 and a PDCP layer 515 may be implemented by the central unit, and an RLC layer 520, a MAC layer 525, and a PHY layer 530 may be implemented by the DU. In various examples the CU and the DU may be collocated or non-collocated. The first option 505-a may be useful in a macro cell, micro cell, or pico cell deployment.

A second option 505-b shows a unified implementation of a protocol stack, in which the protocol stack is implemented in a single network access device (e.g., access node (AN), new radio base station (NR BS), a new radio Node-B (NR NB), a network node (NN), or the like). In the second option, the RRC layer 510, the PDCP layer 515, the RLC layer 520, the MAC layer 525, and the PHY layer 530 may each be implemented by the AN. The second option 505-b may be useful in a femto cell deployment.

Regardless of whether a network access device implements part or all of a protocol stack, a UE may implement an entire protocol stack (e.g., the RRC layer 510, the PDCP layer 515, the RLC layer 520, the MAC layer 525, and the PHY layer 530).

Figure 6:
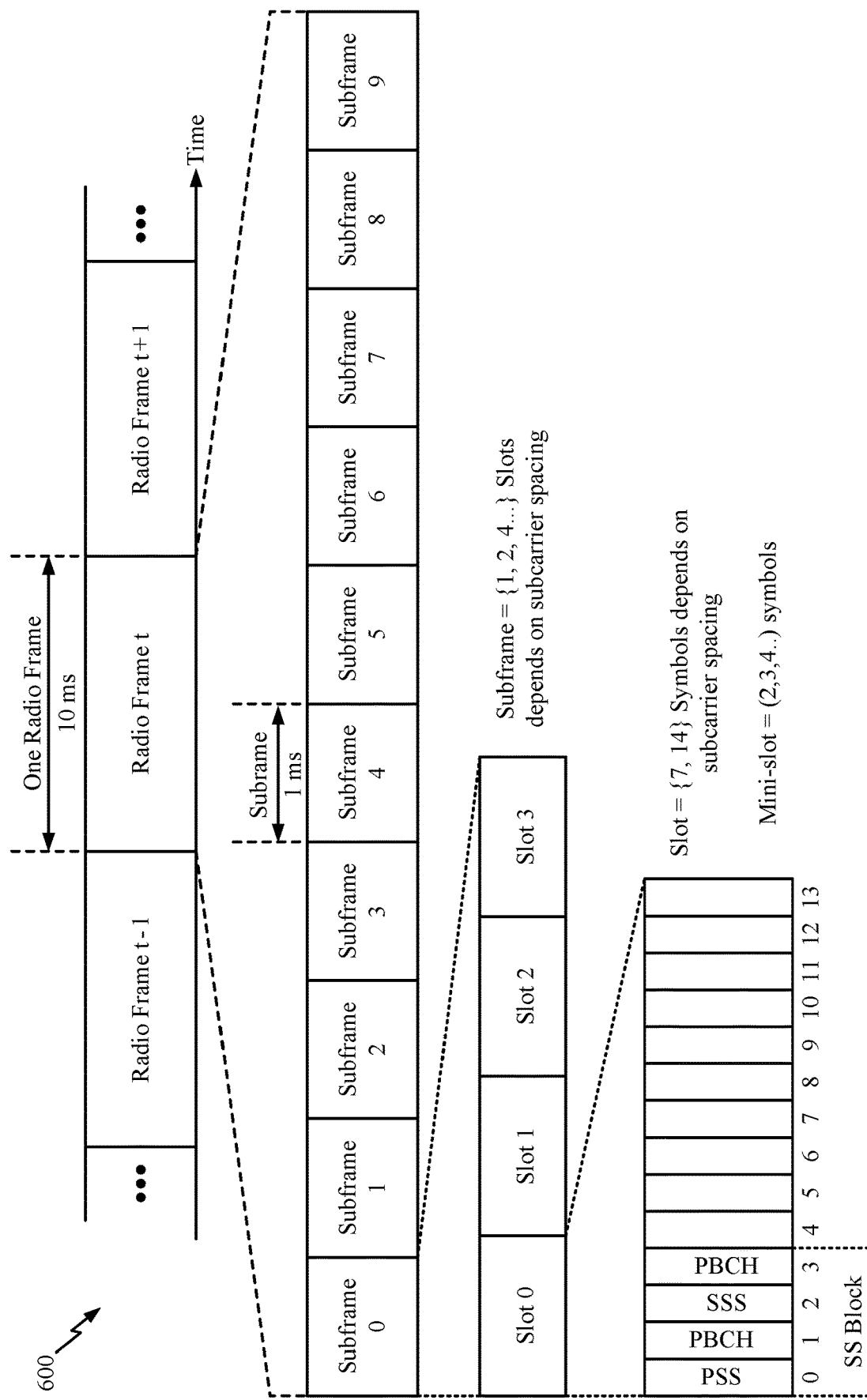
FIG. 6 illustrates an example of a frame format for a new radio (NR) system, in accordance with certain aspects of the present disclosure.

FIG. 6 is a diagram showing an example of a frame format 600 for NR. The transmission timeline for each of the downlink and uplink may be partitioned into units of radio frames. Each radio frame may have a predetermined duration (e.g., 10 ms) and may be partitioned into 10 subframes, each of 1 ms, with indices of 0 through 9. Each subframe may include a variable number of slots depending on the subcarrier spacing. Each slot may include a variable number of symbol periods (e.g., 7 or 14 symbols) depending on the subcarrier spacing. The symbol periods in each slot may be assigned indices. A mini-slot, which may be referred to as a sub-slot structure, refers to a transmit time interval having a duration less than a slot (e.g., 2, 3, or 4 symbols).

Each symbol in a slot may indicate a link direction (e.g., DL, UL, or flexible) for data transmission and the link direction for each subframe may be dynamically switched. The link directions may be based on the slot format. Each slot may include DL/UL data as well as DL/UL control information.

In NR, a synchronization signal (SS) block is transmitted. The SS block includes a PSS, a SSS, and a two symbol PBCH. The SS block can be transmitted in a fixed slot location, such as the symbols 0-3 as shown in FIG. 6. The PSS and SSS may be used by UEs for cell search and acquisition. The PSS may provide half-frame timing, the SS may provide the CP length and frame timing. The PSS and SSS may provide the cell identity. The PBCH carries some basic system information, such as downlink system bandwidth, timing information within radio frame, SS burst set periodicity, system frame number, etc. The SS blocks may be organized into SS bursts to support beam sweeping. Further system information such as, remaining minimum system information (RMSI), system information blocks (SIBs), other system information (OSI) can be transmitted on a physical downlink shared channel (PDSCH) in certain subframes.

In some circumstances, two or more subordinate entities (e.g., UEs) may communicate with each other using sidelink signals. Real-world applications of such sidelink communications may include public safety, proximity services, UE-to-network relaying, vehicle-to-vehicle (V2V) communications, Internet of Everything (IoE) communications, IoT communications, mission-critical mesh, and/or various other suitable applications. Generally, a sidelink signal may refer to a signal communicated from one subordinate entity (e.g., UE1) to another subordinate entity (e.g., UE2) without relaying that communication through the scheduling entity (e.g., UE or BS), even though the scheduling entity may be utilized for scheduling and/or control purposes. In some examples, the sidelink signals may be communicated using a licensed spectrum (unlike wireless local area networks, which typically use an unlicensed spectrum).

A UE may operate in various radio resource configurations, including a configuration associated with transmitting pilots using a dedicated set of resources (e.g., a radio resource control (RRC) dedicated state, etc.) or a configuration associated with transmitting pilots using a common set of resources (e.g., an RRC common state, etc.). When operating in the RRC dedicated state, the UE may select a dedicated set of resources for transmitting a pilot signal to a network. When operating in the RRC common state, the UE may select a common set of resources for transmitting a pilot signal to the network. In either case, a pilot signal transmitted by the UE may be received by one or more network access devices, such as an AN, or a DU, or portions thereof. Each receiving network access device may be configured to receive and measure pilot signals transmitted on the common set of resources, and also receive and measure pilot signals transmitted on dedicated sets of resources allocated to the UEs for which the network access device is a member of a monitoring set of network access devices for the UE. One or more of the receiving network access devices, or a CU to which receiving network access device(s) transmit the measurements of the pilot signals, may use the measurements to identify serving cells for the UEs, or to initiate a change of serving cell for one or more of the UEs.

Examples of Radio Link Monitoring

In order to provide monitoring of active link performances, a UE may perform measurements of a set of reference signals. For example, a UE may monitor and measure one or more references signals in order to determine if a Radio Link Failure (RLF) is detected. The UE may then take appropriate actions to recover the connection.

For example, in LTE, radio link quality may be tied to DL control channel performance. Specifically, in accordance with one or more examples, a reference signal may be transmitted for PDCCH in the Control Resource SET (CORESET). For example, for the CORESET that is used to transmit common/broadcast PDCCH, there may be a control RS transmitted for multiple purposes, including DMRS for PDCCH decoding, to aid frequency/phase tracking, etc. If the RS transmission in the common CORESET is frequent enough, the RS transmission may also be considered for the radio link monitoring.

Further, in accordance with one or more examples, a synchronization signal, i.e. NR-SS, can be used for both the idle and connected mobility RRM measurement. In one example, PBCH DMRS may be used for the measurement as well. Similarly, NR SS block, including NR-SSS and potentially PBCH DMRS, may also be considered for the radio link monitoring purposes.

In addition, CSI-RS may be configured for the connected UE to achieve finer beam tracking. The configured CSI-RS may be considered a reliable source for radio link monitoring, in terms of smaller periodicity, large bandwidth, etc. In such a case, CSI-RS can also be considered for RLM. Meanwhile, TRS (tacking RS) may also be designed such that it may facilitate the various tracking requirements from the UE, such as frequency, timing tracking, Doppler, delay spared estimation etc. Thus, this signal may also be considered for RLM.

Nevertheless, a UE may be required to have guaranteed periodical signals for the purpose of RLM, which can reflect the DL control channel reliability. It is worth noting that the NW should guarantee the transmission of reference signals for RLM as per configuration that UE assumes. If there is any uncertainty on the transmission of reference signals for RLM, then the UE may not be able to distinguish between the blanked reference signal and very low quality reference signal. Therefore, UE may not be able to tell the low radio link quality reliably, which defeats the purpose of RLM.

Example of Radio Link Monitoring with Sub-Bands and Interference Measurements

There are a few challenges in NR for radio link monitoring purposes. For example, an always-ON direct reference signal (Ex. CRS), which may represent NR-PDCCH performance, may not always be provided. Another challenge in NR is that, in practice, UE DL data may be sporadic, hence a UE may not have persistent observation of DL control channel performance. Moreover, it may be hard for a UE to know whether the NW is transmitting PDCCH or not in order to derive PDCCH reliability. Further, requesting that the NW transmit PDCCH or DMRS for PDCCH periodically for the purpose of monitoring PDCCH reliability for the radio link monitoring purpose may cause unnecessary overhead.

One or more additional challenges may also include a CRS that spans the entire bandwidth. In this case, RLM may use sub-band monitoring. In one or more cases, a sub-band corresponds to a bandwidth part (BWP). Further, another challenge includes CRS that may not support interference measurements (IMR). In this case, RLM may use IMR.

In accordance with one or more aspects of embodiments described herein, radio link monitoring of different frequency resources. The different frequency resources may, for example, be different sub-bands within larger system bandwidth. Sub-bands are also referred to herein as bandwidth parts (BWPs), and interference measurements may be provided.

Particularly, in accordance with one or more cases, NR may support one or more reference signals for radio link monitoring (RLM) purpose. Further, a UE may assume the transmission of periodic RS for RLM in accordance with one or more cases. For example, one or more of the following RS may be considered as a candidate RS for radio link monitoring measurement, (1) Common RS in the common CORESET, (2) NR SS block, i.e. NR-SSS potentially combined with PBCH DMRS, (3) CSI-RS, or (4) TRS.

In accordance with some cases, other RS may also be considered as a candidate for radio link monitoring. Further, in yet other cases, other signals and/or measurements of signals may be considered as candidates for radio link monitoring including, for example, one or more interference measurements. According to one or more cases, the radio link quality may be associated with the reliability of NR DL control channel, i.e. NR-PDCCH.

Figure 7:
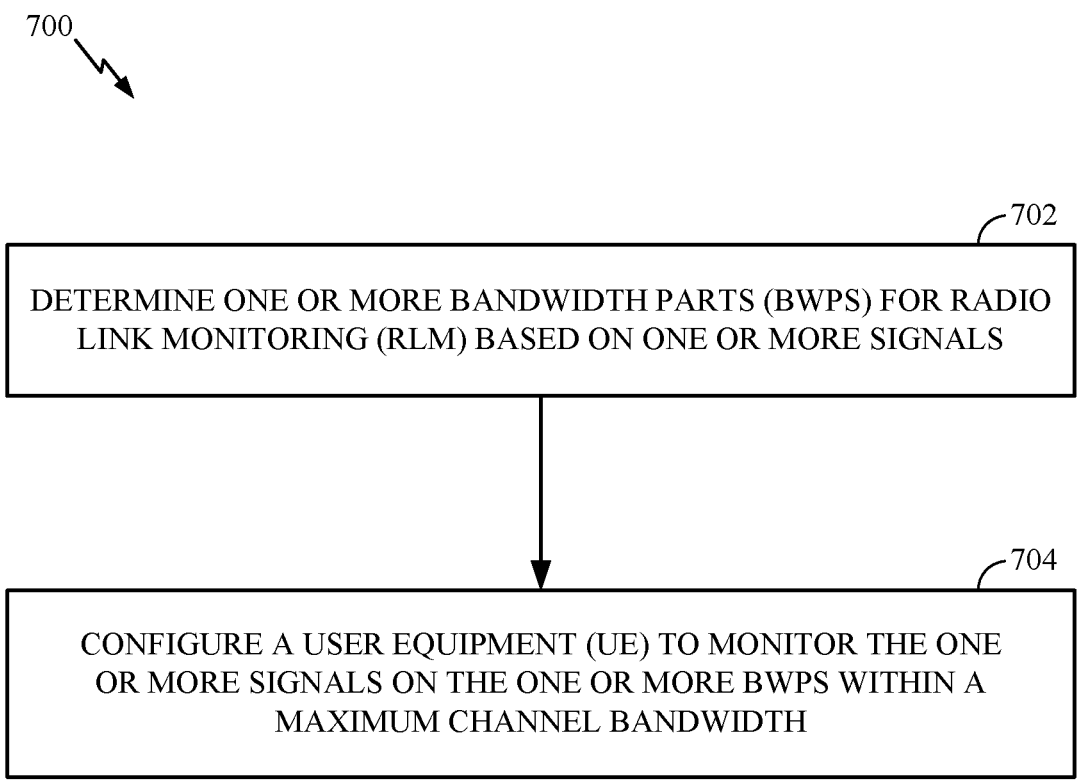
FIG. 7 illustrates example operations for wireless communications by a network entity, in accordance with aspects of the present disclosure.

FIG. 7 illustrates an example of operations 700 for wireless communications that may be performed by a network entity, in accordance with aspects of the present disclosure.

Specifically, operations 700 begin, at block 702, with determining one or more BWPs for radio link monitoring (RLM) based on one or more signals. Further, operations 700 may further include, at block 704, configuring a user equipment (UE) to monitor the one or more signals on the one or more BWPs within a maximum channel bandwidth.

According to one or more cases, on the network side, the network entity (NW) may provide an reference signal (RS) configuration for monitoring one or more beam pair links (BPLs). The network entity may notify a UE to monitor one or more reference signals. The reference signals may include, for example, NR synchronization signal (NR-SS), a time reference signal (TRS), a channel state information-reference signal (CSI-RS), and a demodulation reference signal (DMRS).

In one or more cases, a network RS configuration may specify a number of antenna ports, an RS signal time configuration, an RS signal frequency configuration, and/or a sub-frame configuration. In accordance with one or more cases, a subset of a network RS configuration may be reserved for RLM.

A network entity may configure the UE to monitor one or more sub-bands within a maximum channel bandwidth for RLM. Additionally, in one or more examples, RLM can be performed on each sub-band, where RLM is based on individual sub-band RS measurements. In some cases, RLM can be performed taking a function of RS measurements of one or more sub-bands. In accordance with one or more examples, the function that may be used may be, for example, a maximum of reference signal received power (RSRP) or a signal to interference plus noise ratio (SINR) metric. The network entity may configure priority for sub-bands for RLM purposes. Further, in some cases, the network entity may configure one or more sub-bands as primary and other sub-bands as secondary.

In one or more cases, the network entity may configure a UE to perform interference measurements (IMR) for RLM. Further, RLM may take interference measurements as an input in addition to RS measurements. In some cases, RLM may use IMR within one or more sub-bands. Further, in some cases, RLM may use long term averaging of interference measurements.

Figure 8:
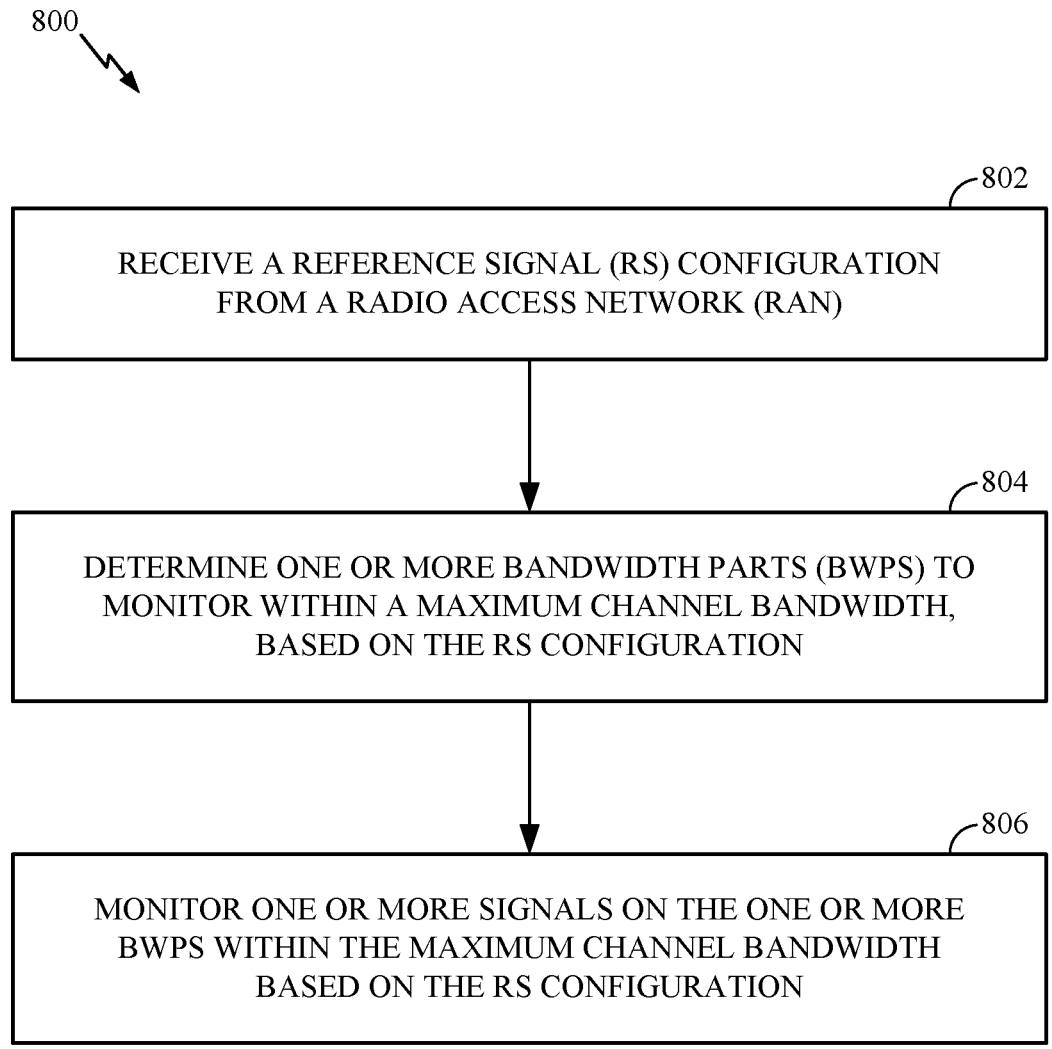
FIG. 8 illustrates example operations for wireless communications by a user equipment (UE), in accordance with aspects of the present disclosure.

FIG. 8 illustrates an example of operations 800 for wireless communications by a user equipment (UE), in accordance with aspects of the present disclosure.

Specifically, operations 800 begin, at block 802, with receiving a reference signal (RS) configuration from a radio access network (RAN). The operation 800 may further include, at block 804, determining one or more BWPs to monitor within a maximum channel bandwidth, based on the RS configuration. Additionally, the operations 800 include, at block 806, monitoring one or more signals on the one or more BWPs within the maximum channel bandwidth based on the RS configuration.

In accordance with one or more cases, on a UE side, a UE may use sub-band measurements for in-sync and out-of-sync (IS/OOS) indications. For example, IS/OOS can be based on one or more sub-bands. In another example, IS/OOS may consider a function of sub-band measurements. In one or more cases, the function may be a max or an average of signal quality measurements. Further, in accordance with one or more cases, the function may be a minimum of IMR measurements. The IMR measurements may provide an interference prediction corresponding to the hypothesis of beam/TRP transmission. Further, IS/OOS may consider short or long term interference measurements.

FIGS. 9A, 9B, and 9C illustrate examples of bandwidth parts (BWPs) in accordance with aspects of the present disclosure. BWPs may comprise a number of different sizes and placements within a given bandwidth. Associated reference signal may be provided in a number of different places as well. Selection of these different BWP arrangement as well as when to use, or transition between, the different BWP arrangement may be supported or based on one or more of the different measurements that are collected or provided.

For example, turning to FIG. 9A, a first BWP1 910 may be provided along with a reference signal 912. The reference signal 912 may be provided such that the reference signal 912 is itself located within, outside, or a combination of inside and outside the BWP1 910 as shown. Further, FIG. 9A shows a second BWP2 920 that may be a subset of the BWP1 910. In some cases, the reference signals 922 associated with BWP2 920 may be provided at a location in the BWP2 920 as shown.

In some cases, as shown in FIG. 9B, the BWP1 930 and the BWP2 940 may not overlap in bandwidth. Further, as shown, the BWP1 930 may be defined as a smaller bandwidth as compared to BWP2 940. Further, the reference signal 932 associated with the BWP1 930 may be provided within BWP1 930. Similarly, associated reference signals 942 and 944 show different options for locating reference signals associated with BWP2 940 somewhere within BWP2.

As shown in FIG. 9C, the opposite of that shown in FIG. 9B may be provided. Specifically, BWP1 950 may include a larger bandwidth that BWP2 960 as shown. Similar to FIG. 9B, FIG. 9C shows placements of associated reference signals 952 and 962 within each corresponding BWP.

In one or more cases, the reference signals may be provided at other locations within each corresponding BWP or even outside the corresponding BWP. In some cases, the size and placement of the BWPs may be determined based on any number of measurements. A UE may be moved from one BWP to another based on one or more conditions of the channels as indicated by one or more measurements.

Figure 10:
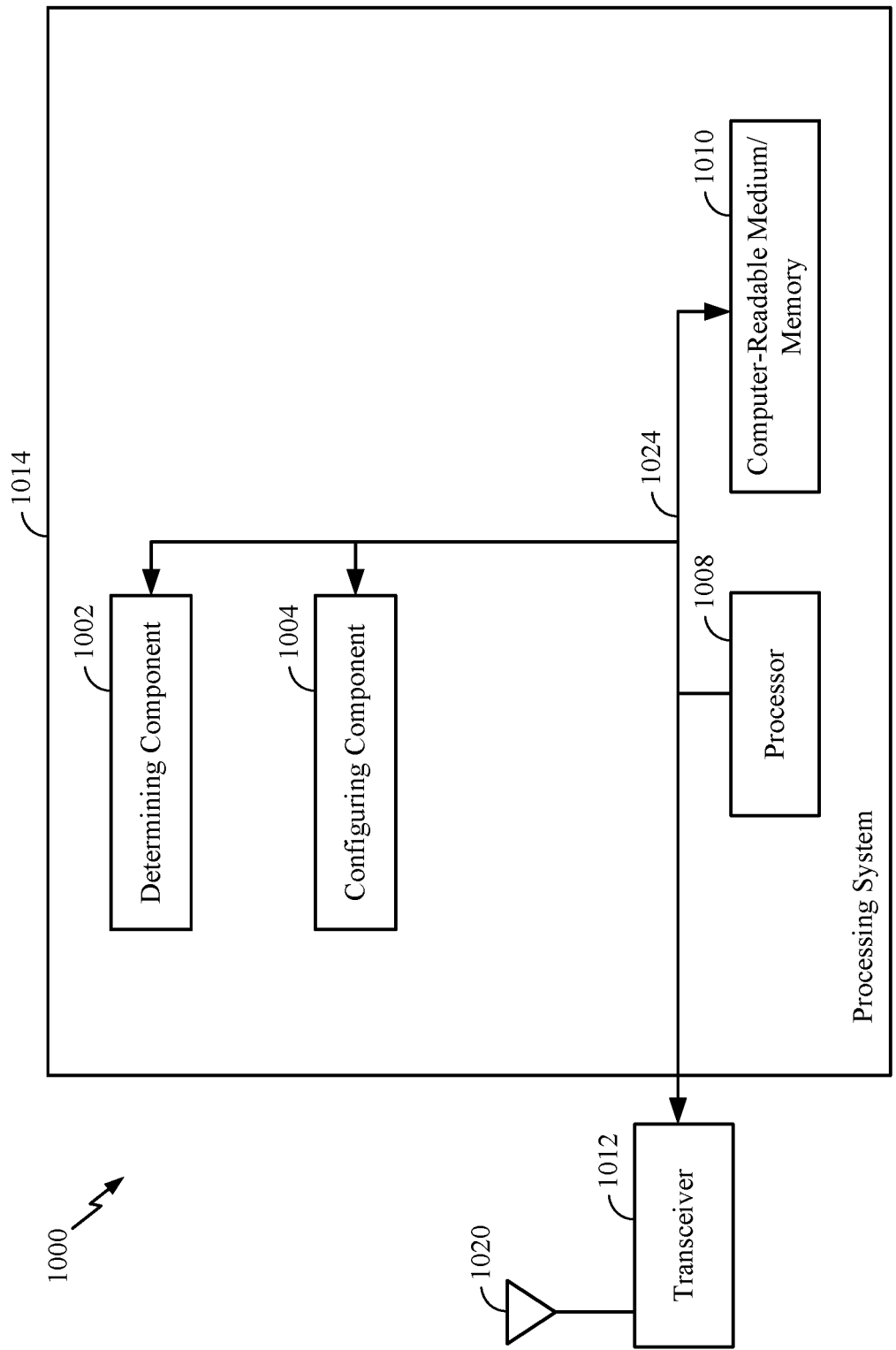
FIG. 10 illustrates a communications device that may include various components configured to perform operations for the techniques described herein in accordance with aspects of the present disclosure.

FIG. 10 illustrates a communications device 1000 that may include various components (e.g., corresponding to means-plus-function components) configured to perform operations for the techniques described herein, such as the operations 700 illustrated in FIG. 7. The communications device 1000 includes a processing system 1014 coupled to a transceiver 1012. The transceiver 1012 is configured to transmit and receive signals for the communications device 1000 via an antenna 1020, such as the various signal described herein. The processing system 1014 may be configured to perform processing functions for the communications device 1000, including processing signals received and/or to be transmitted by the communications device 1000.

The processing system 1014 includes a processor 1008 coupled to a computer-readable medium/memory 1010 via a bus 1024. In certain aspects, the computer-readable medium/memory 1010 is configured to store instructions that when executed by processor 1008, cause the processor 1008 to perform the operations illustrated in FIG. 7, or other operations for performing the various techniques discussed herein. In certain aspects, the processing system 1014 further includes a determining component 1002 for performing the operations illustrated at 702 in FIG. 7. The processing system 1014 also includes a configuring component 1004 for performing the operations illustrated at 704 in FIG. 7.

The determining component 1002 and configuring component 1004 may be coupled to the processor 1008 via bus 1024. In certain aspects, the determining component 1002 and configuring component 1004 may be hardware circuits. In certain aspects, the determining component 1002 and configuring component 1004 may be software components that are executed and run on processor 1008.

Figure 11:
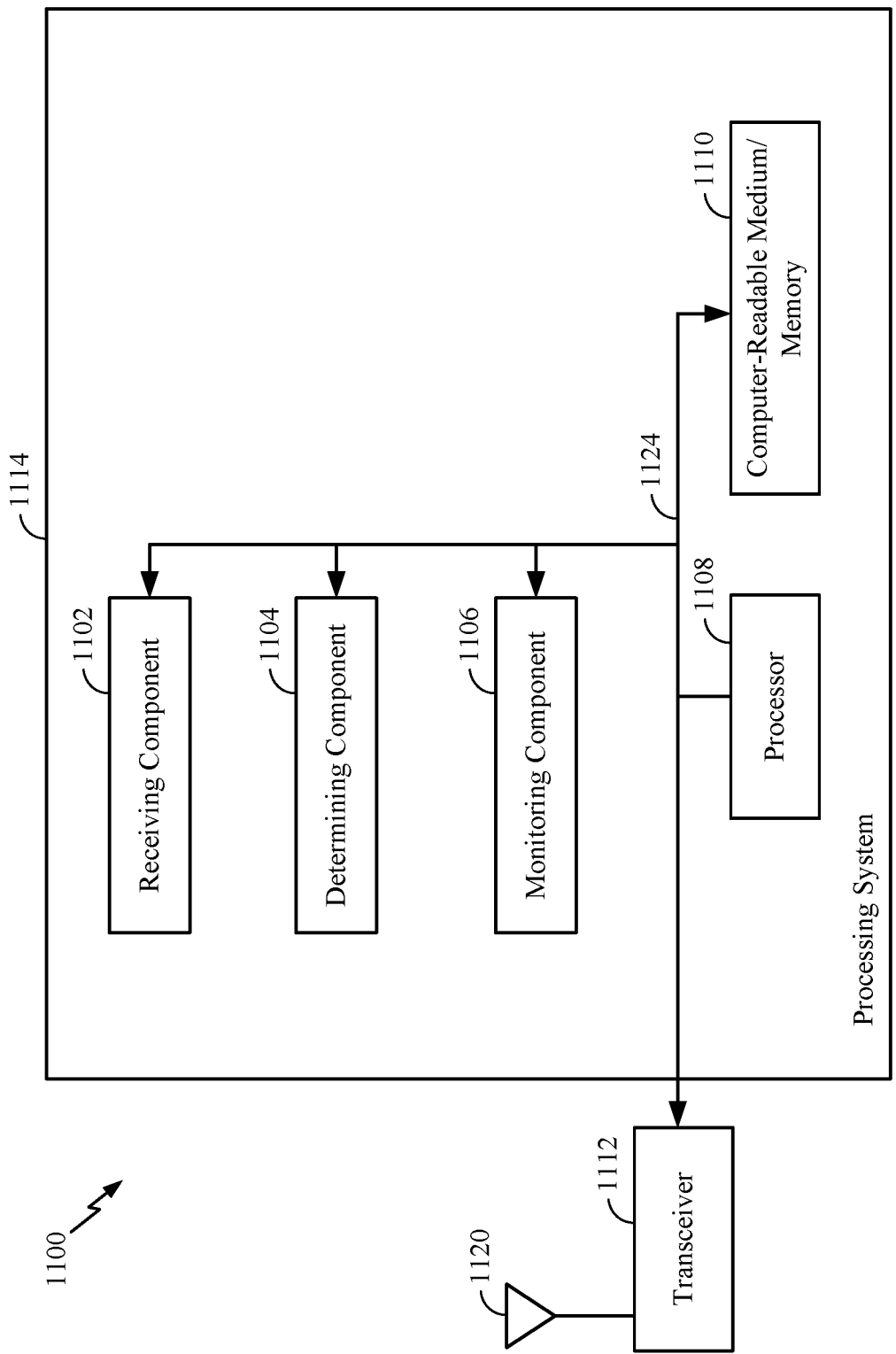
FIG. 11 illustrates a communications device that may include various components configured to perform operations for the techniques described herein in accordance with aspects of the present disclosure.

FIG. 11 illustrates a communications device 1100 that may include various components (e.g., corresponding to means-plus-function components) configured to perform operations for the techniques described herein, such as the operations 800 illustrated in FIG. 8. The communications device 1100 includes a processing system 1114 coupled to a transceiver 1112. The transceiver 1112 is configured to transmit and receive signals for the communications device 1100 via an antenna 1120, such as the various signal described herein. The processing system 1114 may be configured to perform processing functions for the communications device 1100, including processing signals received and/or to be transmitted by the communications device 1100.

The processing system 1114 includes a processor 1108 coupled to a computer-readable medium/memory 1110 via a bus 1124. In certain aspects, the computer-readable medium/ memory 1110 is configured to store instructions that when executed by processor 1108, cause the processor 1108 to perform the operations illustrated in FIG. 8, or other operations for performing the various techniques discussed herein.

In certain aspects, the processing system 1114 further includes a receiving component 1102 for performing the operations illustrated at 802 in FIG. 8. The processing system 1114 also includes a determining component 1104 for performing the operations illustrated at 804 in FIG. 8. Additionally, the processing system 1114 includes a monitoring component 1106 for performing the operations illustrated at 806 in FIG. 8.

The receiving component 1102, determining component 1104, and monitoring component 1106 may be coupled to the processor 1108 via bus 1124. In certain aspects, receiving component 1102, determining component 1104, and monitoring component 1106 may be hardware circuits. In certain aspects, the receiving component 1102, determining component 1104, and monitoring component 1106 may be software components that are executed and run on processor 1108.

The methods described herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c). As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." For example, the articles "a" and "an" as used in this application and the appended claims should generally be construed to mean "one or more" unless specified otherwise or clear from the context to be directed to a singular form. Unless specifically stated otherwise, the term "some" refers to one or more. Moreover, the term "or" is intended to mean an inclusive "or" rather than an exclusive "or." That is, unless specified otherwise, or clear from the context, the phrase, for example, "X employs A or B" is intended to mean any of the natural inclusive permutations. That is, for example the phrase "X employs A or B" is satisfied by any of the following instances: X employs A; X employs B; or X employs both A and B. All structural and functional equivalents to the elements of the various aspects described throughout this disclosure that are known or later come to be known to those of ordinary skill in the art are expressly incorporated herein by reference and are intended to be encompassed by the claims. Moreover, nothing described herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for."

Figure 7A:
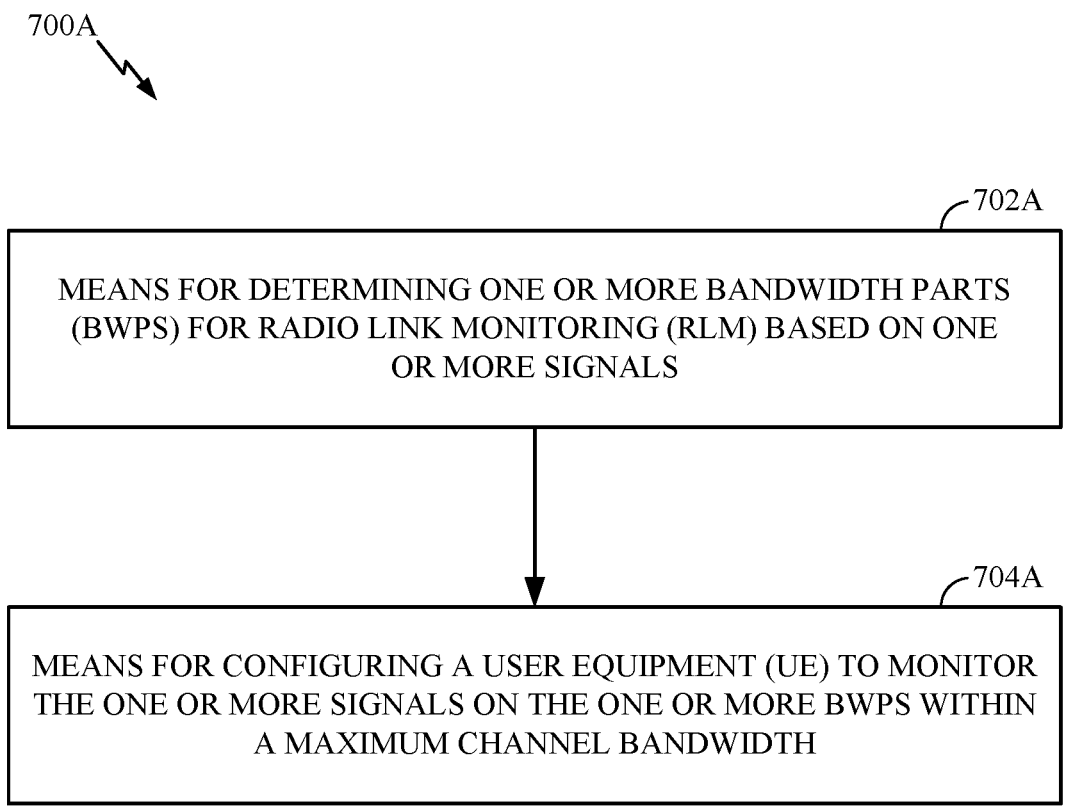
FIG. 7A illustrates example components capable of performing the operations shown in FIG. 7.
Figure 8A:
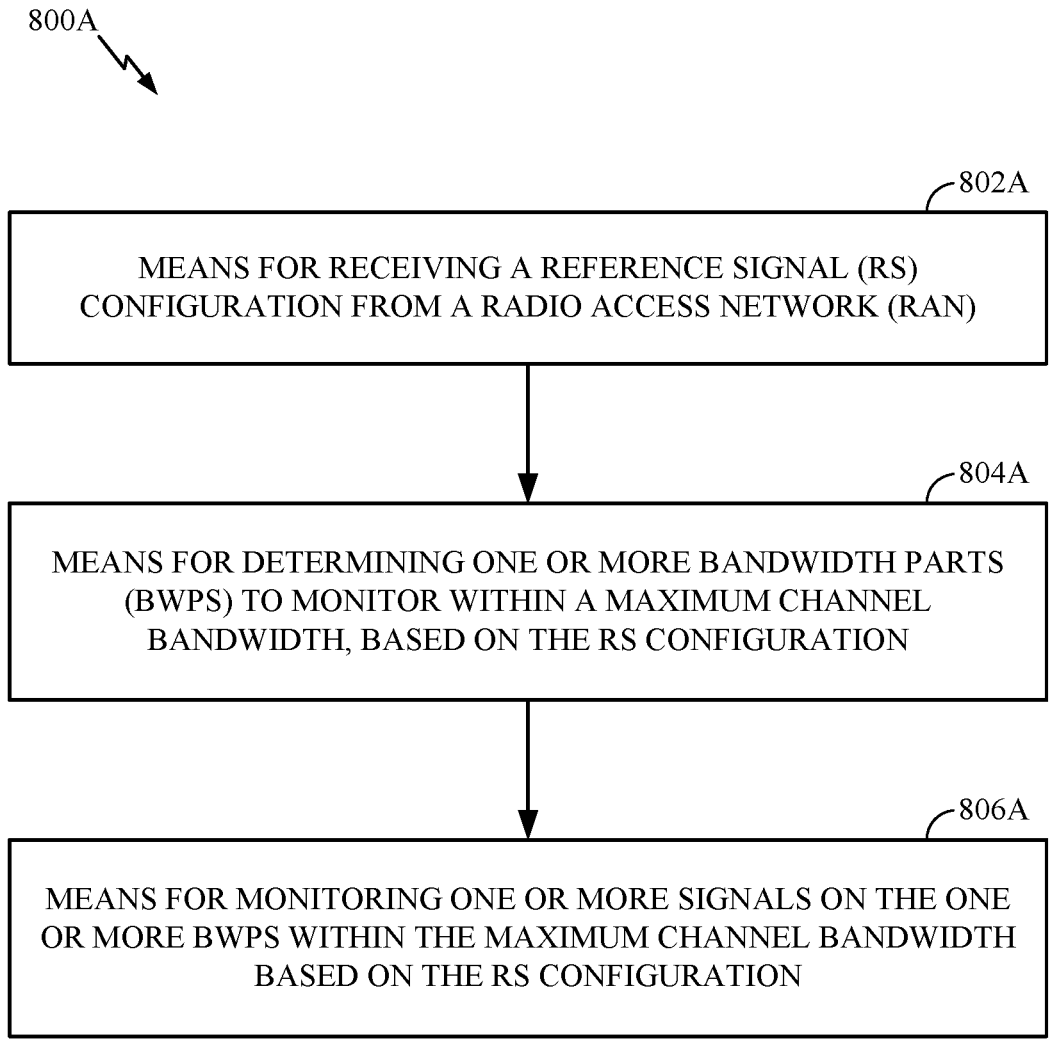
FIG. 8A illustrates example components capable of performing the operations shown in FIG. 8.

The various operations of methods described above may be performed by any suitable means capable of performing the corresponding functions. The means may include various hardware and/or software component(s) and/or module (s), including, but not limited to a circuit, an application specific integrated circuit (ASIC), or processor. Generally, where there are operations illustrated in figures, those operations may have corresponding counterpart means-plus-function components with similar numbering. For example, operations 700 illustrated in FIG. 7, and operations 800 illustrated in FIG. 8, correspond to means 700A illustrated in FIG. 7A, means 800A illustrated in FIG. 8A, respectively.

For example, means for transmitting and/or means for receiving may comprise one or more of a transmit processor 420, a TX MIMO processor 430, a receive processor 438, or antenna(s) 434 of the base station 110 and/or the transmit processor 464, a TX MIMO processor 466, a receive processor 458, or antenna(s) 452 of the user equipment 120. Additionally, means for determining, means for configuring, and/or means for monitoring may comprise one or more processors, such as the controller/processor 440 of the base station 110 and/or the controller/processor 480 of the user equipment 120.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal 120 (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, phase change memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein. For example, instructions for performing the operations described herein and illustrated in the appended figures.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

What is claimed is:

1. A method for wireless communications by a network entity comprising:
   determining a plurality of frequency bandwidth parts (BWPs) for radio link monitoring (RLM), each of the plurality of frequency BWPs comprising a subset of frequency resources within a maximum frequency channel bandwidth, wherein a corresponding one or more reference signals (RSs) are transmitted over each of the plurality of frequency BWPs, and wherein each of the plurality of frequency BWPs corresponds to at least one of a plurality of RS configurations; and transmitting, to a user equipment (UE), an RS configuration of the plurality of RS configurations, the RS configuration indicating a frequency BWP of the plurality of frequency BWPs to monitor for the corresponding one or more RSs.

2. The method of claim 1, wherein transmitting the RS configuration comprises:
configuring the UE to perform interference measurements (IMR) for RLM of at least one of the one or more RSs.

3. The method of claim 2, wherein the RLM takes IMR as an input in addition to RS measurements.

4. The method of claim 2, wherein the RLM uses the IMR within one or more frequency BWPs.

5. The method of claim 2, wherein the RLM uses long term averaging of the IMR.

6. The method of claim 1, wherein the RS configuration is specific to one or more frequency BWPs.

7. The method of claim 1, wherein the one or more RSs include one or more of an NR synchronization signal (NR-SS), a time reference signal (TRS), a channel state information reference signal (CSI-RS), or a demodulation reference signal (DMRS).

8. The method of claim 1, wherein transmitting the RS configuration comprises:
specifying at least one of one or more antenna ports, an RS signal time configuration, an RS signal frequency configuration, or a sub-frame configuration.

9. The method of claim 1, wherein transmitting the RS configuration comprises: configuring priority for frequency BWPs for RLM purposes.

10. The method of claim 1, wherein transmitting the RS configuration comprises: configuring one or more frequency BWPs as primary and others as secondary.

11. The method of claim 1, wherein transmitting the RS configuration comprises:
configuring RLM to be performed on each frequency BWP, wherein RLM is based on individual frequency BWP RS measurements.

12. The method of claim 1, wherein transmitting the RS configuration comprises:
configuring RLM to be performed taking a best of RS measurements of one or more frequency BWPs.

13. A method for wireless communications by a user equipment (UE) comprising:
receiving a reference signal (RS) configuration from a radio access network (RAN), the RS configuration indicating a frequency bandwidth part (BWP) comprising a subset of frequency resources within a maximum frequency channel bandwidth to monitor for a corresponding one or more RSs transmitted over the indicated frequency BWP, the indicated frequency BWP being one of a plurality of frequency BWPs, and wherein each of the plurality of frequency BWPs corresponds to at least one of a plurality of RS configurations; and
monitoring the corresponding one or more RSs on the indicated frequency BWP based on the RS configuration.

14. The method of claim 13, further comprising:
generating one or more in-sync and out-of-sync (IS/OOS) indications based on frequency BWP measurements of the indicated frequency BWP obtained during monitoring the corresponding one or more RSs.

15. The method of claim 14, wherein the one or more IS/OOS indications are based on frequency BWP measurements of one or more indicated frequency BWPs.

16. The method of claim 14, wherein an IS indication of the one or more IS/OOS indications is a best of frequency BWP measurements.

17. The method of claim 14, wherein the one or more IS/OOS indications consider short or long term interference measurements.

18. A network entity, comprising:
a memory; and
a processor coupled to the memory, wherein the processor is configured to:
determine a plurality of frequency bandwidth parts (BWPs) for radio link monitoring (RLM), each of the plurality of frequency BWPs comprising a subset of frequency resources within a maximum frequency channel bandwidth, wherein a corresponding one or more reference signals (RSs) are transmitted over each of the plurality of frequency BWPs, and wherein each of the plurality of frequency BWPs corresponds to at least one of a plurality of RS configurations; and
transmit, to a user equipment (UE), an RS configuration of the plurality of RS configurations, the RS configuration indicating a frequency BWP of the plurality of frequency BWPs to monitor for the corresponding one or more RSs.

19. The network entity of claim 18, wherein the RS configuration is specific to one or more frequency BWPs.

20. The network entity of claim 18, wherein the one or more RSs include one or more of an NR synchronization signal (NR-SS), a time reference signal (TRS), a channel state information reference signal (CSI-RS), or a demodulation reference signal (DMRS).

21. The network entity of claim 18, wherein the RS configuration specifies at least one of one or more antenna ports, an RS signal time configuration, an RS signal frequency configuration, or a sub-frame configuration.

22. The network entity of claim 18, wherein the one or more RS s include an NR synchronization signal (NR-SS).

23. The network entity of claim 18, wherein the one or more RSs include a time reference signal (TRS).

24. The network entity of claim 18, wherein the one or more RS s include a channel state information-reference signal (CSI-RS).

25. The network entity of claim 18, wherein the one or more RSs include a demodulation reference signal (DMRS).

26. The network entity of claim 18, wherein the RS configuration specifies one or more antenna ports.

27. The network entity of claim 18, wherein the RS configuration specifies an RS signal time configuration.

28. The network entity of claim 18, wherein the RS configuration specifies an RS signal frequency configuration.

29. The network entity of claim 18, wherein the RS configuration specifies a sub-frame configuration.

30. A user equipment (UE), comprising:
a memory; and
a processor coupled to the memory, wherein the processor is configured to:
receive a reference signal (RS) configuration from a radio access network (RAN), the RS configuration indicating a frequency bandwidth part (BWP) comprising a subset of frequency resources within a maximum frequency channel bandwidth to monitor for a corresponding one or more RSs transmitted over the indicated frequency BWP, the indicated frequency BWP being one of a plurality of frequency BWPs, and wherein each of the plurality of frequency BWPs corresponds to at least one of a plurality of RS configurations; and monitor the corresponding one or more RSs on the indicated frequency BWP based on the RS configuration.

31. The UE of claim 30, wherein the processor is further configured to:

generate one or more in-sync and out-of-sync (IS/OOS) indications based on frequency BWP measurements of the indicated frequency BWP obtained during monitoring the corresponding one or more RSs.

32. The UE of claim 31, wherein the one or more IS/OOS indications are based on frequency BWP measurements of one or more indicated frequency BWPs.

33. The UE of claim 30, wherein the one or more RSs include an NR synchronization signal (NR-SS).

34. The UE of claim 30, wherein the one or more RSs include a time reference signal (TRS).

35. The UE of claim 30, wherein the one or more RSs include a channel state information-reference signal (CSI-RS).

36. The UE of claim 30, wherein the one or more RSs include a demodulation reference signal (DMRS).

37. A non-transitory computer-readable storage medium configured to store instructions that when executed by a network entity, cause the network entity to perform operations for wireless communication, the operations comprising:

determining a plurality of frequency bandwidth parts (BWPs) for radio link monitoring (RLM), each of the plurality of frequency BWPs comprising a subset of frequency resources within a maximum frequency channel bandwidth, wherein a corresponding one or more reference signals (RSs) are transmitted over each of the plurality of frequency BWPs, and wherein each of the plurality of frequency BWPs corresponds to at least one of a plurality of RS configurations; and transmitting, to a user equipment (UE), an RS configuration of the plurality of RS configurations, the RS configuration indicating a frequency BWP of the plurality of frequency BWPs to monitor for the corresponding one or more RSs.

38. The non-transitory computer-readable storage medium of claim 37, wherein the RS configuration is specific to one or more frequency BWPs.

39. The non-transitory computer-readable storage medium of claim 37, wherein the one or more RSs include one or more of an NR synchronization signal (NR-SS), a time reference signal (TRS), a channel state information-reference signal (CSI-RS), or a demodulation reference signal (DMRS).

40. The non-transitory computer-readable storage medium of claim 38, wherein transmitting the RS configuration comprises:

specifying at least one of one or more antenna ports, an RS signal time configuration, an RS signal frequency configuration, or a sub-frame configuration.

41. A non-transitory computer-readable storage medium configured to store instructions that, when executed by a user equipment (UE), cause the UE to perform operations for wireless communication, the operations comprising:

receiving a reference signal (RS) configuration from a radio access network (RAN), the RS configuration indicating a frequency bandwidth part (BWP) comprising a subset of frequency resources within a maximum frequency channel bandwidth to monitor for a corresponding one or more RSs transmitted over the indicated frequency BWP, the indicated frequency BWP being one of a plurality of frequency BWPs, and wherein each of the plurality of frequency BWPs corresponds to at least one of a plurality of RS configurations; and monitoring the corresponding one or more RSs on the indicated frequency BWP based on the RS configuration.

42. The non-transitory computer-readable storage medium of claim 41, wherein the operations further comprise:

generating one or more in-sync and out-of-sync (IS/OOS) indications based on frequency BWP measurements of the indicated frequency BWP obtained during monitoring the corresponding one or more RSs.

43. The non-transitory computer-readable storage medium of claim 42, wherein the one or more IS/OOS indications are based on frequency BWP measurements of one or more indicated frequency BWPs.

* * * * *